April 8, 1952 — R. P. LEROY — 2,591,838
WAVE FILTER
Filed Feb. 5, 1947 — 2 SHEETS—SHEET 1

INVENTOR
ROBERT PIERRE LEROY
By Adams & Bush
ATTORNEYS

April 8, 1952 R. P. LEROY 2,591,838
WAVE FILTER
Filed Feb. 5, 1947 2 SHEETS—SHEET 2

INVENTOR
ROBERT PIERRE LEROY
By Adams & Bush
ATTORNEYS

Patented Apr. 8, 1952

2,591,838

UNITED STATES PATENT OFFICE 2,591,838

WAVE FILTER

Robert Pierre Leroy, Paris, France, assignor to Compagnie Generale d'Electricite, Paris, France, a corporation of France Application February 5, 1947, Serial No. 726,503
In France August 23, 1945

Section 1, Public Law 690, August 8, 1946
Patent expires August 23, 1965

8 Claims. (Cl. 178—44)

This present invention relates to electric filters used in the application of weak currents as in communication circuits.

The present invention has for its object to provide symmetrical units of the lattice or bridge type an arrangement which, as is known, makes it possible to produce symmetrical filters of the most general kind, obtained by means of a smaller number of elements than with equivalent units of the type of filters heretofore usually employed having two sets of two identical reactances.

The units which form the subject matter of the present invention are characterised by the fact that they comprise two sets of reactances arranged in lattice form, one of said sets consisting of two identical oppositely positioned reactances, and the other set consisting of two unequal reactances, while the values of the constituent elements of each of these four reactances are determined in the manner explained below, so as to obtain in their construction a saving of elements of at least one circuit element as compared with the equivalent unit of the mentioned type as heretofore usually employed.

Although the mode of determination of these filters may be fixed independently of that of the type of filters heretofore usually employed having two sets of two identical reactances it is preferable, for the sake of clarity, to refer to the latter, the properties of which are well known, and to deduce the constitution of the new filters here described from that of the old filters of the prior art, to which they are electrically equivalent.

Usual filters in lattice form as heretofore employed comprise two input terminals A, B, two output terminals C, D, and four reactances, in pairs $Z_1$, $Z_1$ and $Z_2$, $Z_2$. Figure 1 represents an example of the above arrangement.

Moreover, such filters as heretofore used are symmetrical, that is to say that their operation is not changed if C, D are taken as input terminals and A, B as output terminals.

In the new unit of the present invention shown in Figure 2, one of the sets of oppositely positioned reactances, $Z_2$, for example of Fig. 1, has been retained, whilst the other set of opposed reactances is replaced by two unequal reactances $X_1$ and $X_2$.

The filter shown in Figure 2 is still a symmetrical filter as above defined, and it is easy to see that the condition of electric equivalence between the two filters is:

$$\frac{1}{X_1+Z_2}+\frac{1}{X_2+Z_2}=\frac{2}{Z_1+Z_2} \quad (1)$$

The interchange of reactances $X_1$ and $X_2$ does not alter the intensity of the output current nor the voltage difference at the output terminals, but only the values of the voltage differences $V_C$—$V_A$ and $V_D$—$V_B$. The position of the reactances $X_1$ and $X_2$ in their own part of the unit is therefore unimportant, and their interchange is possible in all circuit diagrams which will be shown. The different expressions obtained for the reactances of the part of the unit they constitute, may be individually attributed to them arbitrarily.

With a given lattice structure in which $Z_1$ and $Z_2$ are known the relation (1) makes it possible to deduce therefrom a large number of equivalent structures for reactances $X_1$ and $X_2$, inasmuch as a certain additional freedom is available.

However, if $Z_1$ and $Z_2$ are known functions of the angular frequency of the signals to be transmitted, it is nevertheless necessary that the functions $X_1$ and $X_2$ of $\omega$ which were first determined from the relation (1) should represent these reactances, and this leads to certain restrictions in regard to their constitution. For instance, it is not possible to take arbitrarily for $X_1$ any function of $\omega$, because the value of $X_2$ which would be deduced therefrom could not generally be represented by a practically realisable electrical system. Nevertheless, a certain amount of freedom is left, which may be turned to account to simplify the structure of the filter.

The manner in which the elements of filters, according to the present invention, are determined will therefore be explained, starting from the mentioned usual type of filter units with two distinct sets of impedance $Z_1$, $Z_2$, whether such filters consist of coils and condensers, or whether they comprise electromechanical elements such as piezo-electric crystals.

We shall, here consider band filters. The present invention, however, is not limited to the above cases and it may be applied to all filters properly so-called, except all-band filters.

We shall confine ourselves to filters with a single pass band. It will be supposed, therefore, that zero and infinite frequencies are in the suppressed bands which are eliminated, and that the reactances $Z_1$ and $Z_2$ of the two sets of branches have simultaneously either zeros or poles for such frequencies.

Finally, we shall confine ourselves in the first place to the case where there is no other zero or pole in the suppressed bands.

Within the limits of these assumptions, four cases have to be considered, according to the values of $Z_1$ and $Z_2$ at the frequencies 0 and $\infty$.

*Case I.*—$Z_1$ and $Z_2$ have zero values for the frequencies 0 and $\infty$.

*Case II.*—$Z_1$ and $Z_2$ have zero values for zero frequency and poles for infinite frequency.

*Case III.*—$Z_1$ and $Z_2$ have poles for the frequencies 0 and $\infty$.

*Case IV.*—$Z_1$ and $Z_2$ have poles for the zero frequency and zero values for the frequency $\infty$.

Cases III and IV may be referred back to the cases I and II respectively by replacing the reactances $Z_1$ and $Z_2$ by their reciprocals. Since the transformation defined by Equation 1 stands good if $X_1$ and $X_2$ are simultaneously replaced by their reciprocals at the same time as $Z_1$ and $Z_2$ are so replaced, new units are obtained in cases III and IV which comprise reactances $X_1$ and $X_2$ which are the inverses respectively of those obtained in cases I and II.

On the other hand, each of cases I to IV is itself subdivided into two kinds according as to whether the two cut-off frequencies which limit the pass band are, as to one of them, a critical frequency of $Z_1$, and as to the other, a critical frequency $Z_2$ ($Z_1$ and $Z_2$ being then of the same degree) (case A), or as to whether they are both critical frequencies of the same reactance, for instance $Z_1$ ($Z_2$ being then of a lower degree than $Z_2$): (case B).

A critical frequency of a reactance X is a frequency for which $X=0$ or $X=\infty$.

The degree of a reactance is the degree of the rational fraction which represents this reactance, that is, the highest exponent of frequency appearing in the numerator or denominator of the fraction expressing that reactance.

To each of cases IA to IVA, as above defined, there corresponds a unit according to the invention, comprising in relation to the equivalent ordinary unit of the type above mentioned, a reduction of one unit of the number of resonant circuits in one of the branches which is transformed, while to each of the cases IB to IVB there corresponds a unit, according to the present invention, comprising in relation to the equivalent unit of the mentioned ordinary type, a reduction of two resonant circuits, such reduction affecting either two circuits of the same branch or a circuit in each of the two branches.

*Case I-A.*—In this case the reactances of the mentioned usual type of unit are expressed as follows:

$$Z_1=\frac{A_1p(p^2+\omega_3^2)\ldots(p^2+\omega_{2n}^2)}{(p^2+\omega_1^2)\ldots(p^2+\omega_{2n+1}^2)}$$

and $$Z_2=\frac{A_2p(p^2+\omega_3^2)\ldots(p^2+\omega_{2n+1}^2)}{(p^2+\omega_2^2)\ldots(p^2+\omega_{2n}^2)(p^2+\omega_{2n+2}^2)} \quad (2)$$

where $A_1$ and $A_2$ are positive constants, and $\omega_1, \omega_2 \ldots \omega_{2m+2}$ represent the angular frequencies arranged in the order of increasing values.

Reactance $Z_1$ may therefore be realised in practice in the ordinary "parallel" type of circuit diagram considered by way of example, by setting in parallel an inductance, a capacity and $n$ resonant circuits, and the arrangement formed by a capacity in parallel with $p$ resonant circuits, may, if the capacity is not too small, be replaced by $p$ piezo-electric crystals such as quartz elements grouped in parallel with a capacity if necessary.

The unit, according to the present invention, which is equivalent to a unit of this type IA, is obtained by substituting for one of the two oppositely positioned sets of equal reactances, $Z_1$ for instance, two unequal reactances $X_1$ and $X_2$ which are determined, as will be explained below, in such a way that one of them shall comprise, when constructed of parallel resonant circuits, one resonant circuit less than the reactances of the set of reactances replaced thereby.

Figure 1:
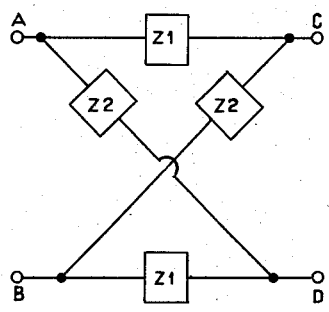
Figure 2:
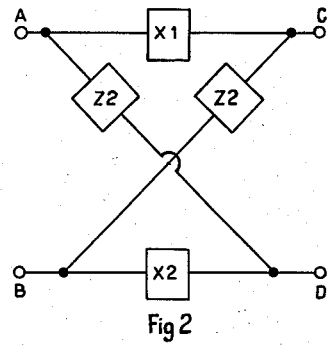
Figure 3:
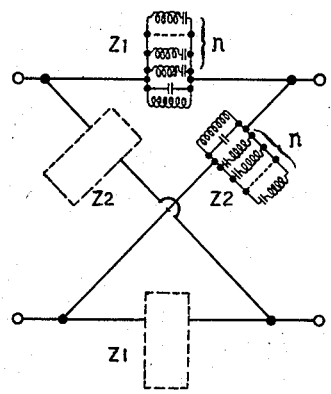
Figure 3 illustrates an example in which there is employed such an ordinary type of unit as heretofore used, furnished with resonant circuits.
Figure 4:
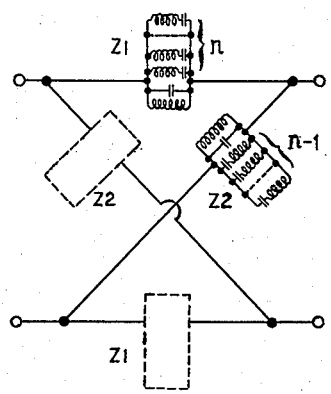
Fig. 4 illustrates a filter according to my invention
Figure 5:
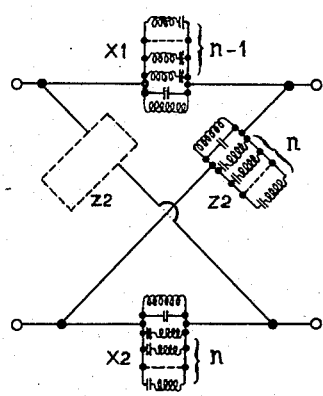

Figure 5 illustrates a non-limitative example of an embodiment of a unit of this type of case I-A.

*Case IB.*—The reactances $Z_1$ have the same expression as in the case IA, the reactances $Z_2$ being of the value $$Z_2=\frac{A_2p(p^2+\omega_3^2)\ldots(p^2+\omega_{2n-1}^2)}{(p^2+\omega_2^2)\ldots(p^2+\omega_{2n}^2)}$$

The unit, according to the present invention, equivalent to the ordinary unit of this type, is then formed by replacing the branches of the highest degree, namely $Z_1$, by two unequal reactances $X_1$ and $X_2$, the constituent circuit elements whereof are determined as hereafter described.

Figure 6:
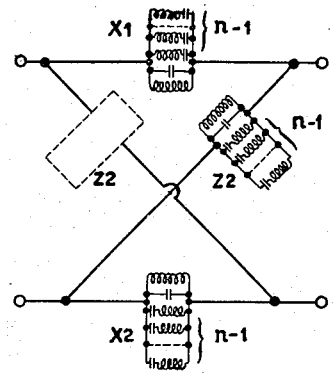
Figure 7:
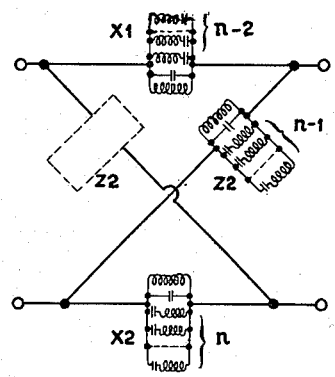

Figures 6 and 7 represent, by way of non-limitative examples, modes of construction of the units of type IB according to the present invention, furnished with resonant circuits, the gain of number of resonant circuits, as compared with the comparison unit of the ordinary type, being one circuit at $X_1$ and one circuit at $X_2$ for Figure 6 and two circuits at $X_1$ for Figure 7.

*Case II-A.*—In this case the reactances of the comparison type of ordinary unit with two pairs of equal reactances are expressed as follows:

$$Z_1=\frac{A_1p(p^2+\omega_3^2)\ldots(p^2+\omega_{2n}^2)}{(p^2+\omega^2)(p^2+\omega_3^2)\ldots(p^2+\omega_{2n-1}^2)}$$

$$Z_2=\frac{A_2p(p^2+\omega_3^2)\ldots(p^2+\omega_{2n+1}^2)}{(p^2+\omega_2^2)\ldots(p^2+\omega_{2n}^2)}$$

Figure 8:
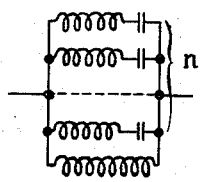
Figure 9:
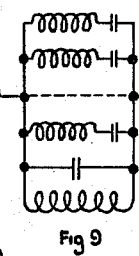
Figure 12:
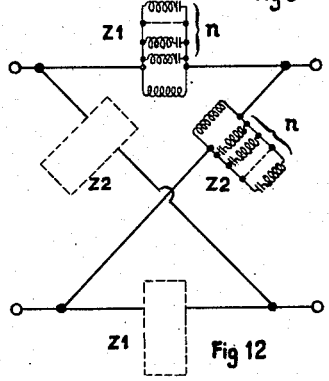
Figure 13:
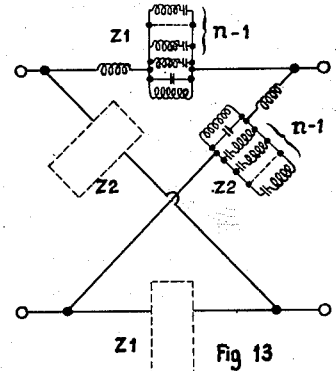

This type of unit may be obtained in practice, in the parallel arrangement for instance, by means of reactances composed of $n$ resonant circuits in parallel with one inductance (Fig. 8) or of one inductance in series with the group of $n-1$ resonant circuits in parallel (Fig. 9). Figures 12 and 13 represent modes of construction of this unit.

*Case II-B.*—In this case, the reactance $Z_1$ of the standard cell has the same value as in the previous case, and the reactance $Z_2$ is equal to:

$$Z_2=\frac{A_2p(p^2+\omega_3^2)\ldots(p^2+\omega_{2n-1}^2)}{(p^2+\omega_2^2)\ldots(p^2+\omega_{2n-2}^2)}$$

Figure 10:
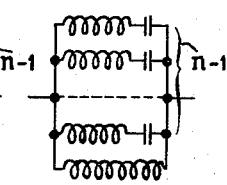
Figure 11:
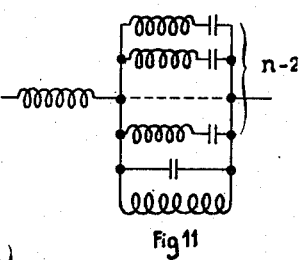

It has one resonant circuit less than $Z_1$ and it can be constructed, either by $n-1$ resonant circuits in parallel and one inductance (Figure 10), or by putting in series with an inductance of a group of $n-2$ resonant circuits in parallel, a capacity and an inductance (Fig. 11).

Figure 14:
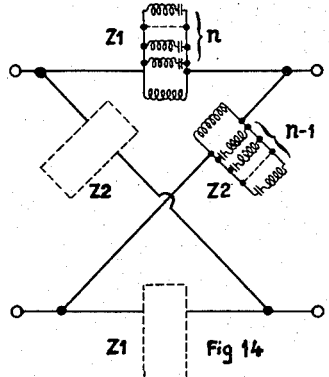
Figure 15:
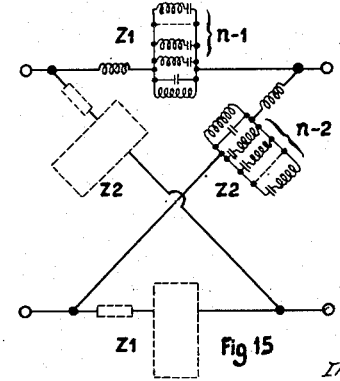

The corresponding ordinary types of filters may be represented by Figures 14 and 15.

Equivalent units, according to the present invention are produced by replacing the two equal reactances $Z_1$ of the ordinary types of units by two reactances $X_1$ and $X_2$, determined as hereinafter explained, whereby it is possible to gain, as compared with an ordinary type of unit, either the elements of two resonant circuits at one of said reactances, or, in more generalized manner, the elements of one resonant circuit at each of them.

It is to be noted that the transformations of the reactances which comprise quartz piezo-electric elements cannot be realised except when the capacities in parallel in the circuit of $X_1$ and $X_2$ do not fall below a certain value.

It is clear that the circuit diagrams shown, which correspond to one of the possible modes of realisation of the reactances, do not limit the applications of the present invention, because $X_1$ and $X_2$ may be obtained, according to the known rules of the synthesis of dipoles, in the form of a graduated structure in series with a transformer, which structures make it also possible, according to the present invention, to reduce the number of constituent elements of the units correlatively with the reduction of degree of $X_1$ and $X_2$, with reference to the degree of the reactances $Z_1$ of the ordinary type of unit which they replace.

For instance, in case II, the reactances $Z_1$ and $Z_2$ may consist of the primary of a transformer, the secondary of which is closed by a group in parallel of $n-1$ or $n-2$ resonant circuits, and of a capacity (either of $n-1$ or $n-2$ quartz piezoelectric elements and possibly a condenser); the present invention then makes it possible to obtain relatively to $Z_1$, in the case IIa, the gain of a resonant circuit or a quartz element at $X_1$ and $X_2$, and in case IIb, a gain of one circuit at $X_1$ and $X_2$ or of two circuits at $X_1$ or $X_2$.

However, in the case of the circuits which comprise transformers, the ordinary type of unit makes it possible to use common secondary circuits, so that under these conditions, the new filters become less important.

We shall now describe the method which makes it possible to produce filters according to the present invention, and indicate the mode for determination of the circuit elements of such filters in cases I-A and I-B.

*Case I-A.*—If it is desired to replace the arm $Z_1$ by $X_1$ and $X_2$, it is necessary to solve the Equation 1 by means of reactances.

Let us take:

(3) $\begin{cases} (p^2+\omega_2^2) \ldots (p^2+\omega_{2n}^2) = U_n \\ (p^2+\omega_1^2) \ldots (p^2+\omega_{2n+1}^2) = V_n \end{cases}$ and consequently:

(4) $\begin{cases} Z_1 = \dfrac{A_1 p U_n}{(p^2+\omega_1^2) V_n} \\ Z_2 = \dfrac{A_2 p V_n}{(p^2+\omega_{2n+2}^2) U_n} \end{cases}$ hence:

(5)
$$Z_1+Z_2 = p\frac{A_1(p^2+\omega_{2n+2}^2)U_n^2 + A_2(p^2+\omega_1^2)V_n^2}{(p^2+\omega_1^2)(p^2\omega_{2n+2}^2)U_n V_n}$$

$$= \frac{pW_{2n+1}(p^2)}{(p^2+\omega_1^2)(p^2+\omega_{2n+2}^2)}$$

where (6) $W_{2n+1}(p^2) = A_1(p^2+\omega_{2n+2}^2)U_n^2 + A_2(p^2+\omega_1^2)V_n^2$ $W_{2n+1}(p^2) = 0$ has $(2n+1)$ roots in $p^2(-\sigma_1^2, \ldots, -\sigma_{2n+2}^2)$ which are distributed, according to the theorem of the reactance applied to $Z_1+Z_2$, in accordance with the law:

(7) $\omega_1^2 < \sigma_1^2 < \omega_2^2 < \sigma_2^2 < \omega_3^2 \ldots$
$\ldots < \omega_{2n}^2 < \sigma_{2n}^2 < \omega_{2n+1}^2 < \sigma_{2n+1}^2 < \omega_{2n+2}^2$ From (5) one gets:

(8) $\dfrac{2}{Z_1+Z_2} = \dfrac{2(p^2+\omega_1^2)(p^2+\omega_{2n+2}^2)U_n V_n}{pW_{2n+1}(p^2)}$ The theorem of the reactance shows that $$\frac{1}{X_1+Z_2}$$

and $$\frac{1}{X_2+Z_2}$$

have no poles other than $$\frac{1}{Z_1+Z_2}$$

as they have zeros the poles of $Z_2$, they may be written in the form:

(9)
$$\frac{1}{X_1+Z_2} = \frac{(p^2+\omega_{2n+2}^2)U_n[(p^2+\omega_1^2)V_n - k^2 T_{n+1}(p^2)]}{pW_{2n+1}(p^2)}$$

$$\frac{1}{X_2+Z_2} = \frac{(p^2+\omega_{2n+2}^2)V_n[(p^2+\omega_1^2)V_n + k^2 T_{n+1}(p^2)]}{pW_{2n+1}(p^2)}$$

which satisfies Equation 1 formally, $T_{n+1}(p^2)$ designating a polynomial of $(n+1)$ degree in most at $p^2$ whose coefficient of the term of the highest degree is supposed equal to unity, and $k^2$ being a positive constant.

The "residue" of a function of $f^{(z)}$ in the vicinity of $Z=Z_0$, is defined by stating that if a function $f^{(z)}$ represented by a power series in $$\frac{1}{Z-Z_0}$$

has a pole (becomes infinite) for $Z=Z_0$, then the coefficient of the first power term $$\frac{1}{Z-Z_0}$$

in the immediate vicinity of $Z=Z_0$ is called its "residue" for this pole. The residue can also be defined in terms of the integral of the function around a small circle surrounding the pole.

For all the poles of $Z_2$, $X_1+Z_2$ and $X_2+Z_2$ must have residues at least equal to those of $Z_2$, or of $Z_1$ and $Z_2$. It follows from (1) that they must be equal; hence, $T_{n+1}(p^2)$ will become zero for all the poles of $Z_2$, so that:

(10) $T_{n+1}(p^2) = (p^2+\omega_{2n+2}^2)U_n$ and $X_1+Z_2$ and $X_2+Z_2$ may be written:

(11) $\begin{cases} X_1+Z_2 = \\ \quad \dfrac{pW_{2n+1}(p^2)}{(p^2+\omega_{2n+2}^2)U_n[(p^2+\omega_1^2)V_n - k^2(p^2+\omega_{2n+2}^2)U_n]} \\ X_2+Z_2 = \\ \quad \dfrac{pW_{2n+1}(p^2)}{(p^2+\omega_{2n+2}^2)U_n[(p^2+\omega_1^2)V_n + k^2(p^2+\omega_{2n+2}^2)U_n]} \end{cases}$ If $X_1 + Z_2$ and $X_2 + Z_2$ are reactances, as they have all the poles of $Z_2$ with equal residues, and $Z_2$ has only zeros for zero and infinite frequencies, the same applies to $X_1$ and $X_2$.

It is therefore sufficient to express $X_1+Z_2$ and $X_2+Z_2$ as reactances.

Inasmuch as, for $k^2=0$, they are identical with $Z_1+Z_2$, they cannot lose the character of reactance before, due to the increase of $k^2$, there appears for their denominator, set equal to 0, a root either infinite or zero, or common with a root of $W_{2n+1}(p^2)=0$. But according to (7), for $k^2=0$, the roots of $(p^2+\omega_1^2)V_n \pm k^2(p^2+\omega_{2n+2}^2)V_n = 0$ are separated from one another and from infinity by the roots of $W_{2n+1}(p^2) = 0$.

Consequently, if $k^2$ is made to increase starting from zero, it will not be posible to meet any infinite root. It is therefore the zero root alone which has to be considered; it will be obtained for the value $k_0^2$ of $k^2$ given by:

(12) $$k_0^2 = \frac{\omega_1^2 \omega_3^2 \ldots \omega_{2n+1}^2}{\omega_2^2 \omega_4^2 \ldots \omega_{2n+2}^2}$$

and the condition:

(13) $$k^2 \leqslant k_0^2$$

will have to be observed.

Let us now determine $k^2$ so as to bring out a factor $p^2 + \sigma^2$ of $W_{2n+1}(p^2)$ on one of the denominators of $X_1 + Z_2$, or $X_2 + Z_2$. For that value of $k^2$ we shall have $$W_{2n+1}(-\sigma^2) = A_1(\omega_{2n+2}^2 - \sigma^2) V_n^2(-\sigma^2) + A_2(\omega_1^2 - \sigma^2) V_n(-\sigma^2) = 0$$

$$(\omega_1^2 - \sigma^2) V_n(-\sigma^2) \mp k^2(\omega_{2n+2}^2 - \sigma^2) U_n(-\sigma^2) = 0$$

The second relation gives:

$$\frac{U_n^2(-\sigma^2)}{(\omega_1^2 - \sigma^2)^2 k^2 (\omega_{2n+2}^2 - \sigma^2)^2} = V_n^2(-\sigma^2)$$

and eliminating $U_n^2(-\sigma^2)$ and $V_n^2(-\sigma^2)$ between the latter and $W_{2n+1}(-\sigma^2) = 0$, we obtain:

(14) $$A_1(\omega_1^2 - \sigma^2) + k^4 A_2(\omega_{2n+2}^2 - \sigma^2) = 0$$

and consequently:

(15) $$k^2 = \sqrt{\frac{A_1}{A_2} \frac{\sigma^2 - \omega_1^2}{\omega_{2n+2}^2 - \sigma^2}}$$

$k^2$ increases from 0 to $\infty$ if $\sigma^2$ increases from $\omega_1^2$ to $\omega_{2n+2}^2$.

The smallest value of $k^2$ which alone has to be retained, therefore corresponds to the smallest of the values of $\sigma^2$ namely, $\sigma_1^2$ and calling this value $k_1^2$, we have:

(16) $$k_1^2 = \sqrt{\frac{A_1}{A_2} \frac{\sigma_1^2 - \omega_1^2}{\omega_{2n+2}^2 - \sigma_1^2}}$$

or by replacing $$\frac{A_1}{A_2} \text{ by } \frac{(\sigma_1^2 - \omega_1^2) V_n^2(-\sigma_1^2)}{(\omega_{2n+2}^2 - \sigma_1^2) U_n^2(-\sigma_1^2)}$$

(17) $$k_1^2 = \frac{(\sigma_1^2 - \omega_1^2)(\omega_3^2 - \sigma_1^2) \ldots (\omega_{2n+1}^2 - \sigma_1^2)}{(\omega_2^2 - \sigma_1^2)(\omega_4^2 - \sigma_1^2) \ldots (\omega_{2n+2}^2 - \sigma_1^2)}$$

which value can only be used if $k_1^2$ is less than the value $k_0^2$ expressed by (12):

$$k_0^2 = \frac{\omega_1^2 \omega_3^2 \ldots \omega_{2n+1}^2}{\omega_2^2 \omega_4^2 \ldots \omega_{2n+2}^2}$$

Now, let us consider the expression:

(18) $$\zeta(p) = \frac{p(p^2 + \omega_2^2)(p^2 + \omega_4^2) \ldots (p^2 + \omega_{2n+2}^2)}{(p^2 + \omega_1^2)(p^2 + \omega_3^2) \ldots (p^2 + \omega_{2n+1}^2)}$$

which is a reactance: $\zeta(p)$ is an increasing function of $(-p^2)$ when $(-p^2)$ increases from $\omega_1^2$ to $\omega_2^2$; likewise $$\theta(-p^2) = \zeta(p)$$
$$= \frac{(-\omega_1^2 - p^2)(p^2 + \omega_3^2) \ldots (\omega_{2n+1}^2 + p^2)}{(p^2 + \omega_2^2)(p^2 + \omega_4^2) \ldots (p^2 + \omega_{2n+2}^2)}$$

we have:
$$k_1^2 = \theta(-\sigma_1^2)$$

When $(-p^2)$ increases from $\omega_1^2$ to $\omega_2^2$ then $\theta(-p^2)$ increases from 0 to infinity taking as a sole value $\eta_1^2$ the value $k_0^2 = -\theta(0)$ so that $\eta_1^2$ being defined by:

(19) $$\frac{\eta_1^2 - \omega_1^2}{\omega_{2n+2}^2 - \eta_1^2} \cdot \frac{V_n(-\eta_1^2)}{U_n(-\eta_1^2)} = \frac{\omega_1^2 \omega_3^2 \ldots \omega_{2n+1}^2}{\omega_2^2 \omega_4^2 \ldots \omega_{2n+2}^2}$$

if $\sigma_1^2 < \eta_1^2$ we have $k_1^2 < k_0^2$ and if $\sigma_1^2 > \eta_1^2$ we have $k_1^2 > k_0^2$.

But, if the zeros and the poles of $Z_1$ and $Z_2$ are given, $\sigma_1^2$ depends from $$\frac{A_1}{A_2}$$

decreasing from $\omega_2^2$ to $\omega_1^2$ when $$\frac{A_1}{A_2}$$

decreases from $\infty$ to 0. It is therefore necessary, in order that $\sigma_1^2$ shall be less than $\eta_1^2$, that $$\frac{A_1}{A_2}$$

shall be less than the value $H_1$ corresponding to $\eta_1^2$, namely $$H_1 = \frac{(\eta_1^2 - \omega_1^2) V_n^2(-\eta_1^2)}{(\omega_{2n+2}^2 - \eta_1^2) U_n^2(-\eta_1^2)}$$

If therefore $$\frac{A_1}{A_2} < H_1$$

the value $k_1^2$ can be used.

The reduction of degree affects $X_2$, seeing that it is the factor $$(p^2 + \omega_1^2) V_n + k^2 (p^2 + \omega_{2n+2}^2) U_n$$

which becomes zero for $p^2 = -\sigma_1^2$; $X_1$ and $X_2$ are expressed by:

$$X_1 = \frac{p(A_1 U_n + k^2 A_2 V_n)}{(p^2 + \omega_1^2) V_n - k^2(p^2 + \omega_{2n+2}^2) U_n}$$

$$X_2 = \frac{p(A_1 U_n - k^2 A_2 V_n)}{(p^2 + \omega_1^2) V_n + k^2(p^2 + \omega_{2n+2}^2) U_n}$$

The elimination of $k^2$ between $A_1 U_n \pm k^2 A_2 V_n = 0$ and $(p^2 + \omega_1^2) V_n \mp (p^2 + \omega_{2n+2}^2) U_n = 0$ produces $$W_{2n+1}(p^2) = 0$$

as expected.

The reactances $Z_1$ and $Z_2$ are formed, as we have seen, by placing in parallel an inductance, a capacity and $n$ resonant circuits, or an inductance and $n$ quartz piezoelectric elements, and by making $k^2 = k_1^2$, we obtain a resonant circuit at $X_2$ which is realised by putting in parallel an inductance, a capacity and $n-1$ resonant circuits, or an inductance and $n-1$ quartz piezoelectric elements.

$X_1$ remains of the same type as $Z_1$.

If $$\frac{A_1}{A_2} = H_1$$

there appears simultaneously a pole of $X_1$ for $p = 0$; this eliminates the parallel inductance appearing in its circuit diagram.

If $$\frac{A_1}{A_2} = H_1$$

the only possible reduction is the elimination of the parallel inductance of $X_1$ for $k^2 = k_0^2$.

In fact, the condition $k_1^2 < k_0^2$ will generally be complied with for narrow band filters.

In effect, $k_0^2$, is greater than $$\frac{\omega_1^2}{\omega_{2n+2}^2}$$

It is therefore sufficient that:

$$k_1^2 < \frac{\omega_1^2}{\omega_{2n+2}^2}$$

or that $$\frac{\sigma_1^2 - \omega_1^2}{\omega_{2n+2}^2 - \sigma_1^2} < \frac{A_1}{A_2} \cdot \frac{\omega_1^2}{\omega_{2n+2}^2}$$

If:

$$\frac{\omega_1}{\omega_{2n+2}} > 0.9, \quad \frac{\omega_1^4}{\omega_{2n+2}^4} > 0.65$$

On the other hand, if P is the propagation constant, we obtain by calling $P\infty$ its value for the infinite frequency $$\left[\text{Th}\frac{p\infty}{2}\right]^{\pm 1} = \sqrt{\frac{A_2}{A_1}}$$

and consequently:

$$\frac{A_2}{A_1} \approx 1 - 4e^{-p\infty}$$

Therefore, we can suppose $P\infty > 3$ nepers (1 neper $= 8.686$ decibels) therefore:

$$\frac{A_2}{A_1} > 1 - 4e^{-3} \text{ or } \frac{A_2}{A_1} > 0.8$$

$$\therefore \frac{A_2}{A_1} \frac{\omega_1^4}{\omega_{2n+2}^4} > 0.52$$

And:

$$\frac{\sigma_1^2 - \omega_1^2}{\omega_{2n+2}^2 - \sigma_1^2} < \frac{\omega_2^2 - \omega_1^2}{\omega_{2n+2}^2 - \omega_2^2} < \frac{\omega_2 - \omega_1}{\omega_{2n+2} - \omega_2}$$

This quantity will generally be of the order of $1/2n$ so that as soon as $n$ is at least equal to 2, the condition will normally be satisfied.

The gain of a resonant circuit will therefore be generally realisable in the usual cases met within practice.

Practically, if the reactances $Z_1$ and $Z_2$ are given, $\sigma_1$ will be determined graphically by the intersection of the curves $Z_1$ and $-Z_2$ between the abcissae $\omega_1$ and $\omega_2$, and $k_1^2$ will be calculated by:

$$(17) \quad k_1^2 = \frac{(\sigma_1^2 - \omega_1^2)(\omega_2^2 - \sigma_1^2) \ldots (\omega_{2n+1}^2 - \sigma_1^2)}{(\omega_2^2 - \sigma_1^2)(\omega_4^2 - \sigma_1^2) \ldots (\omega_{2n+2}^2 - \sigma_1^2)}$$

In order to determine the values of $X_1$ and $X_2$, the following equations are used:

$$(21) \quad \begin{cases} X_1 = \dfrac{p(A_1U_n + k^2 A_2 V_n)}{(p^2+\omega_1^2)V_n - k^2(p^2+\omega_{2n+2}^2)U_n} \\ X_2 = \dfrac{p(A_1U_n - k^2 A_2 V_n)}{(p^2+\omega_1^2)V_n + k^2(p^2+\omega_{2n+2}^2)U_n} \end{cases}$$

by substituting therein for $k^2$ the value of $k_1^2$: if we call $pN_2(p^2)$ and $D_2(p^2)$ the numerator and the denominator of $X_2$, we can put down $$(22) \quad \begin{cases} N_2(p^2) = (p^2+\sigma_1^2)L_{n-1}(p^2) \\ D_2(p^2) = (p^2+\sigma_1^2)M_n(p^2) \end{cases}$$

and $$(23) \quad X_2 = \frac{pL_{n-1}(p^2)}{M_n(p^2)}$$

$L_{n-1}$ and $M_n$ being respectively of $n-1$ and $n$ degrees in $p^2$.

The determination of the elements of $X_1$ and $X_2$ is obtained by resolving the admittances $$\frac{1}{X_1}, \frac{1}{X_2}$$

into their simple elements, according to the classical method, the zeros of $X_1$ and $X_2$ having been determined graphically or by some suitable method of approximation.

If it is desired to effect the substitution at the branches $Z_2$ instead of at the branches $Z_1$, we have to solve, by means of reactances $S_1$ and $S_2$, the equations;

$$(24) \quad \frac{1}{S_1+Z_1} + \frac{1}{S_2+Z_1} = \frac{2}{Z_1+Z_2}$$

which case can be treated like the preceding one.

We find:

$$(25) \quad \begin{cases} S_1 = p\dfrac{A_2V_n + k_{2n+1}^2 A_1 U_n}{(p^2+\omega_{2n+2}^2)U_n - k_{2n+1}^2(p^2+\omega_1^2)V_n} \\ S_2 = p\dfrac{A_2V_n - k_{2n+1}^2 A_1 U_n}{(p^2+\omega_{2n+2}^2)U_n + k_{2n+1}^2(p^2+\omega_1^2)V_n} \end{cases}$$

being a constant determined by:

$$(26) \quad k_{2n+1}^2 = \sqrt{\frac{A_1}{A_2}} \frac{\omega_{2n+2}^2 - \sigma_{2n+1}^2}{\sigma_{2n+1}^2 - \omega_1^2}$$

which becomes acceptable if $$(27) \quad k_{2n+1}^2 < 1$$

which is a condition generally realised, and the application of which in the formulae (25) makes it possible to reduce by two units the degree of $S_2$ (representing a gain of one resonant circuit as compared with $X_1$, and the degree of $S_1$ which remains equal to that of $X_1$).

Let us now consider case I–B, namely the unit expressed by:

$$(28) \quad \begin{cases} Z_1 = \dfrac{A_1p(p^2+\omega_2^2)\ldots(p^2+\omega_{2n}^2)}{(p^2+\omega_1^2)(p^2+\omega_3^2)\ldots(p^2+\omega_{2n+1}^2)} \\ Z_2 = \dfrac{A_2p(p^2+\omega_3^2)\ldots(p^2+\omega_{2n-1}^2)}{(p^2+\omega_2^2)\ldots(p^2+\omega_{2n}^2)} \end{cases}$$

We have:

$$(29) \quad U_n = (p^2+\omega_2^2)\ldots(p^2+\omega_{2n}^2)$$

and $$V_{n-1} = (p^2+\omega_3^2)\ldots(p^2+\omega_{2n-1}^2)$$

We obtain:

$$(30) \quad \begin{cases} Z_1 = \dfrac{A_1 p U_n}{(p^2+\omega_1^2)(p^2+\omega_{2n+1}^2)V_{n-1}} \\ Z_2 = \dfrac{A_2 p V_{n-1}}{U_n} \end{cases}$$

hence:

$$(31) \quad Z_1 + Z_2 = p\frac{A_1 U_n^2 + A_2(p^2+\omega_1^2)(p^2+\omega_{2n+1}^2)V_{n-1}^2}{(p^2+\omega_1^2)(p^2+\omega_{2n+1}^2)U_n V_{n-1}}$$

and $$(32) \quad \frac{1}{Z_1+Z_2} = \frac{(p^2+\omega_1^2)(p^2+\omega_{2n+1}^2)U_n V_{n-1}}{p[A_1 U_n^2 + A_2(p^2+\omega_1^2)(p^2+\omega_{2n+1}^2)V_{n-1}^2]}$$

If we have:

$$(33)$$
$$W_{2n}(p^2) = A_1 U_n^2 + A_2(p^2+\omega_1^2)(p^2+\omega_{2n+1}^2)V_{n-1}^2$$
$$= (A_1+A_2)(p^2+\sigma_1^2)(p^2+\sigma_2^2)\ldots(p^2+\sigma_{2n}^2)$$

$\sigma_1^2, \sigma_2^2 \ldots \sigma_{2n}^2$ are distributed according to the law:

$$(34) \quad \omega_1^2 < \sigma_1^2 < \omega_2^2 < \sigma_2^2 < \omega_3^2 < \ldots < \sigma_{2n-1}^2 < \omega_{2n}^2 < \sigma_{2n}^2 < \omega_{2n+1}^2$$

that is, the reactance theorem applied to $Z_1+Z_2$.

For the equivalent unit $(X_1, X_2, Z_2)$ we have to write:

$$(35)$$
$$\begin{cases} \dfrac{1}{X_1+Z_2} = \\ \dfrac{U_n[(p^2+\omega_1^2)(p^2+\omega_{2n+1}^2)V_{n-1} - k^2(p^2+\epsilon\xi^2)U_n]}{pW_{2n}(p^2)} \quad \epsilon = \pm 1 \\ \dfrac{1}{X_2+Z_2} = \dfrac{U_n[(p^2+\omega_1^2)(p^2+\omega_{2n+1}^2)V_{n-1} + k^2(p^2+\epsilon\xi^2)U_n]}{pW_{2n}(p^2)} \end{cases}$$

which equations satisy Equation 1 in form and indicate that $X_1+Z_2$ and $X_2+Z_2$ admit all the poles (infinite values) of $Z_2$ with residues equal to those of $Z_2$: $k^2$ and $\xi^2$ are parameters which are chosen as will be shown later.

In order that $X_1+Z_2$ and $X_2+Z_2$ which, $\epsilon$, $\xi^2$ being arbitrarily fixed, are identical with $Z_1+Z_2$ for $k^2=0$, should remain reactances when $k^2$ increases, it is necessary and sufficient that the roots of the numerators of Equation 35 set equal to 0 should pass through neither the value 0 (for $k_0^2$), nor the value $\infty$ (for $k^2$), nor a root of $W_{2n}(p^2)=0$.

If these conditions are complied with, $X_1$ and $X_2$ will certainly also be reactances given by the formulae:

$$(36)\begin{cases} X_1=\dfrac{p[A_1U_n+k^2A_2(p^2+\epsilon\xi^2)V_{n+1}]}{(p^2+\omega_1^2)(p^2+\omega_{2n+1}^2)V_{n-1}-k^2(p^2+\epsilon\xi^2)U_n} \\ X_2=\dfrac{p[A_1U_n-k^2A_2(p^2+\epsilon\xi^2)V_{n-1}]}{(p^2+\omega_1^2)(p^2+\omega_{2n+1}^2)V_{n-1}+k^2(p^2+\epsilon\xi^2)U_n} \end{cases}$$

If, between the equations:

$$(37)\begin{cases} A_1U_n\pm k^2A_2(p^2+\epsilon\xi^2)V_{n-1}=0 \\ (p^2+\omega_1^2)(p^2+\omega_{2n+1}^2)V_{n-1}\pm k^2(p^2+\epsilon\xi^2)U_n=0 \end{cases}$$

we eliminate: $k^2(p^2+\epsilon\xi^2)$ then we find $w_{2n}(p^2)=0$, as was to be expected.

If now we eliminate $U_n$ and $V_{n-1}$ we find:

(38)
$$G(p^2)=A_1(p^2+\omega_1^2)(p^2+\omega_{2n+1}^2)+k^4A_2(p^2+\epsilon\xi^2)^2=0$$

$\epsilon\xi^2$ being given, it is necessary to choose $k^2$ so that $G(p^2)$ shall admit a root $(-\sigma^2)$ of $W_{2n}(p^2)$ and it is the smallest value of $k^2$ corresponding to different roots $-\sigma_1^2, -\sigma_2^2, \ldots -\sigma_{2n+1}^2$ which alone concerns us.

If $k^2$ is made to increase from 0, the roots of $G(p^2)=0$, take values from $-\omega_1^2$ and $-\omega_{2n+1}^2$. Inasmuch as $G(-\omega_1^2)$ and $G(-\omega_{2n+1}^2)$ are positive, it follows that $-\omega_1^2$ and $-\omega_{2n+1}^2$ are external to the interval limited by the modified roots; these roots therefore tend towards each other while the root which was equal to $-\omega_1^2$ approaches $-\sigma_1^2$ and the other root approaches $-\sigma_{2n}^2$. These modified roots are the roots of $G(p^2)$ (Equation 38) in which the parameter $k^2$ appears when the value of $k^2$ is increased from zero.

The roots will always continue to approach each other if we cause $k^2$ to increase, because the root can correspond to only one value of $k^2$. The roots cannot cease to be real before they are identical, so that the smallest value of $k^2$ which causes a reduction of degree, will be obtained by replacing $p^2$ in (38) by the values: $-\sigma_1^2$ or $(-\sigma_{2n}^2)$ from which we get the characteristic values:

$$(39)\quad k_1^2=\dfrac{\sqrt{\dfrac{A_1}{A_2}(\sigma_1^2-\omega_1^2)(\omega_{2n+1}^2-\sigma_1^2)}}{|\epsilon\xi^2-\sigma_1^2|}=\sqrt{\dfrac{A_1}{A_2}}\dfrac{\delta_1^2}{|\epsilon\xi^2-\sigma_1^2|}$$

$$(39')\quad k_{2n}^2=\dfrac{\sqrt{\dfrac{A_1}{A_2}(\sigma_{2n}^2-\omega_1^2)(\omega_{2n+1}^2-\delta_{2n}^2)}}{|\epsilon\xi^2-\sigma_{2n}^2|}=\sqrt{\dfrac{A_1}{A_2}}\dfrac{\delta_{2n}^2}{|\epsilon\xi^2-\sigma_{2n}^2|}$$

by putting down:

$$(40)\quad \delta_1^2\sqrt{(\sigma_1^2-\omega_1^2)(\omega_{2n+1}^2-\sigma_1^2)}$$

$$(40')\quad \delta_{2n}^2=\sqrt{(\sigma_{2n}^2-\omega_1^2)(\omega_{2n+1}^2-\sigma_{2n}^2)}$$

It will be observed that for substantial values of $$\dfrac{A_1}{A_2}$$

$\sigma_1$ is near $\omega_2$ and $\sigma_{2n}$ to $\omega_{2n}$ and that they respectively approach $\omega_1$ and $\omega_{2n+1}$ when $$\dfrac{A_1}{A_2}$$

decreases. $\delta_1^2$ and $\delta_{2n}^2$ therefore, decrease simultaneously ($\omega_2^2$ is supposed nearer $\omega_1^2$ than $\omega_{2n}^2$ and nearer $\omega_{2n+1}^2$ than $\omega_1^2$). $\delta_1^2 \leqq \delta_{2n}^2$ is equivalent to $$\sigma_1^2+\sigma_{2n}^2-(\omega_1^2+\omega_{2n+1}^2)\gtreqless 0$$

The smallest of the values $k_1^2$ and $k_{2n}^2$, or their common values will render possible an effective reduction (a gain of one resonant circuit) if it does not exceed the value:

$$(41)\quad k_0^2=\dfrac{\omega_1^2\omega_3^2\ldots\omega_{2n+1}^2}{\omega_2^2\omega_4^2\ldots\omega_{2n}^2\xi^2}$$

or the value $$(42)\quad k_\infty^2=1$$

We have now to discuss separately the two cases $a1\epsilon=+1$ and (A) We must distinguish according to the position of $\xi^2$. If $\xi^2 > \sigma_{2n}^2$ Equations 39 become:

$$(43)\quad k_1^2=\sqrt{\dfrac{A_1}{A_2}}\dfrac{\delta_1^2}{\xi^2-\sigma_1^2}$$

$$(43')\quad k_{2n}^2=\sqrt{\dfrac{A_1}{A_2}}\dfrac{\delta_{2n}^2}{\xi^2-\sigma_{2n}^2}$$

hence:

$$(44)\quad k_1^2\xi_1^2=\sqrt{\dfrac{A_1}{A_2}}\dfrac{\delta_1^2\xi^2}{\xi^2-\sigma_1^2}$$

$$(44')\quad k_{2n}^2\xi^2=\sqrt{\dfrac{A_1}{A_2}}\dfrac{\delta_{2n}^2\xi^2}{\xi^2-\sigma_{2n}^2}$$

Now, it is easy to see that the value $k_1^2$ complies generally with the conditions, $$k_1^2<k_0^2, k_1^2<(k_\infty^2=1)$$

The same evidently applies to $k_{2n}^2$ if it can be used, that is to say, if less than $k_1^2$.

$k_1^2$ is in fact less than $$\sqrt{\dfrac{A_1}{A_2}}\dfrac{\delta_1^2}{\sigma_{2n}^2\sigma_1^2}$$

Now, $$\delta_1^2=\sqrt{(\sigma_1^2-\omega_1^2)(\omega_{2n+1}^2-\sigma_1^2)}$$

is less than $$\sqrt{(\omega_2^2-\omega_1^2)(\omega_{2n+1}^2-\omega_2^2)}$$

If we suppose a fairly regular distribution of the characteristic values, $\omega_2^2-\omega_1^2$ is of the order of $\omega_{2n+1}^2-\omega_2^2$ and $\delta^2$ of the order of $$\dfrac{\omega_{2n+1}^2-\omega_2^2}{\sqrt{2_{n-1}}}\dfrac{\delta_1^2}{\sigma_{2n}^2-\sigma_1^2}$$

will be near $$\dfrac{\omega_{2n+1}^2-\omega_2^2}{(\sigma_{2n}^2-\sigma_1^2)\sqrt{2_{n-1}}}$$

that is to say, near $$\dfrac{1}{\sqrt{2_{n-1}}}$$

and the maximum value $k_1^2$ will therefore be near $$\sqrt{\dfrac{A_1}{A_2}}\dfrac{1}{\sqrt{2_{n-1}}}$$

Consequently, we have $k_1^2<1$ so soon as $n\geqslant 2$, if $p_\infty<3$ nepers (1 neper=8.686 decibels), which is admissible, we have $$\sqrt{\dfrac{A_1}{A_2}}<1\cdot 1$$

Likewise:

$$k_1^2 \xi^2 = \sqrt{\frac{A_1}{A_2}} \frac{\sigma_1^2 \xi^2}{\xi^2 - \sigma_1^2}$$

is less than $$\sqrt{\frac{A_1}{A_2}} \delta_1^2 \frac{\sigma_{2n}^2}{\sigma_{2n}^2 - \sigma_1^2}$$

and of the order of $$\sqrt{\frac{A_1}{A_2}} \frac{\sigma_{2n}^2}{\sqrt{2_{n-1}}}$$

and consequently less than $X^2$.

(45) $\quad X^2 = \dfrac{\omega_1^2 \omega_3^2 \cdots \omega_{2n+1}^2}{\omega_2^2 \omega_4^2 \cdots \omega_{2n}^2}$ which is greater than $\omega_1^2$, if the pass band is not excessively wide.

We therefore see that by taking the smallest of the values $k_1^2$, $k_{2n}^2$, we obtain a reduction of one resonant circuit and that, if these values can be made equal, we obtain a reduction of two circuits on the aggregate of $X_1$ and $X_2$.

Let us therefore compare $k_1^2$ and $k_{2n}^2$.

$k_1^2$ is less than $k_{2n}^2$ if:

$$\frac{\delta_1^2}{\xi^2 - \sigma_1^2} < \frac{\delta_{2n}^2}{\xi^2 - \sigma_{2n}^2}$$

If $$\frac{\delta_1^2}{\delta_{2n}^2} > 1$$

there is a value $\xi_m^2$ given by (46)

(46) $\quad \xi_m^2 = \dfrac{\delta_1^2 \sigma_{2n}^2 - \sigma_1^2 \delta_{2n}^2}{\delta_1^2 - \delta_{2n}^2}$ for which $k_1^2$ and $k_{2n}^2$ become equal, their common value being:

(47) $\quad k_m^2 = \sqrt{\dfrac{A_1}{A_2}} \dfrac{\delta_1^2 - \delta_m^2}{\sigma_{2n}^2 - \sigma_1^2}$ As $k_1^2$ concerns $X_2$ and $k_{2n}^2$, we gain a resonant circuit at $X_1$ as well as $X_2$, subject to the condition $\delta_1^2 > \delta_{2n}^2$.

(b) If now we suppose $\xi^2 < \sigma_1^2$

We have then:

(48) $\quad k_1^2 = \sqrt{\dfrac{A_1}{A_2}} \dfrac{\delta_1^2}{\sigma_1^2 - \xi^2}$ (48′) $\quad k_m^2 = \sqrt{\dfrac{A_1}{A_2}} \dfrac{\delta_{2n}^2}{\sigma_{2n}^2 - \xi^2}$ If $\delta_1^2 > \delta_{2n}^2$, $k_{2n}^2$ is evidently always less than $k_1^2$; $k_1^2$ is equal to $k_{2n}$ for:

$$\xi_m^2 = \frac{\sigma_1 \delta_{2n}^2 - \sigma_{2n}^2 \delta_1^2}{\sigma_{2n}^2 - \sigma_1^2}$$

where $$k_m^2 = \sqrt{\frac{A_1}{A_2}} \frac{\delta_{2n}^2 - \delta_1^2}{\sigma_{2n}^2 - \sigma_1^2}$$

Therefore the condition $$\frac{\delta_1^2}{\delta_{2n}^2} < \frac{\sigma_1^2}{\sigma_{2n}^2}$$

must be realised.

We can see as before that, if $n \geq 2$, we obtain generally:

$$k_m^2 < 1 k_m^2 \xi_m^2 < X^2$$

The reduction concerns $X_1$ ($k_1^2$) and $X_2$ ($k_{2n}^2$).

We therefore gain, in this case, one resonant circuit at $X_1$ as well as at $X_2$.

While this gain in the preceding case assumed the condition $$\frac{\delta_1^2}{\delta_{2n}^2} > 1$$

the condition here is $$\frac{\delta_1^2}{\delta_{2n}^2} < \frac{\sigma_1^2}{\sigma_{2n}^2}$$

which condition is not very different from the complementary case, $$\frac{\sigma_1^2}{\sigma_{2n}^2}$$

being very little less than 1 in the case of bands which are not very wide.

(c) There remains to be considered the case:

$$\sigma_1^2 < \xi^2 < \sigma_{2n}^2$$

We have then:

(49) $\quad k_1^2 = \sqrt{\dfrac{A_1}{A_2}} \dfrac{\delta_1^2}{\xi^2 - \sigma_1^2}$ (49′) $\quad k_{2n}^2 = \sqrt{\dfrac{A_1}{A_2}} \dfrac{\delta_{2n}^2}{\sigma_{2n}^2 - \xi^2}$ There is still a value of $\xi^2$ for which $$k_1^2 = k_{2n}^2 = k_m^2$$

we have:

(50) $\quad k_m^2 = \sqrt{\dfrac{A_1}{A_2}} \dfrac{\delta_1^2 + \delta_{2n}^2}{\sigma_{2n}^2 - \sigma_1^2}$

(51) $\quad \xi_m^2 = \dfrac{\sigma_1^2 \delta_{2n}^2 + \sigma_{2n}^2 \delta_1^2}{\delta_1^2 - \delta_{2n}^2}$

(52) $\quad k_m^2 \xi_m^2 = \sqrt{\dfrac{A_1}{A_2}} \dfrac{\sigma_1^2 \delta_{2n}^2 + \sigma_{2n}^2 \delta_1^2}{\sigma_{2n}^2 - \sigma_1^2}$ Here, $k_m^2$ is of the order of $$2\sqrt{\frac{A_1}{A_2}} \frac{\omega_{2n+1}^2 - \omega_1^2}{(\sigma_{2n}^2 - \sigma_1^2)\sqrt{2_n}}$$

or $$\sqrt{\frac{2}{n}} \sqrt{\frac{A_1}{A_2}} \frac{\omega_{2n+1}^2 - \omega_1^2}{\sigma_{2n}^2 - \sigma_1^2}$$

and will generally be less than 1, if $n \geq 3$.

Likewise, $\xi_m^2 k_m^2$ will generally be less than $X$ if $n > 3$.

If these conditions are fulfilled, there is for the values $\xi_m^2$, $k_m^2$ a gain of two resonant circuits at $X_2$.

(d1) $\xi^2 = \sigma_{2n}^2, k_{2n}^2 = \infty$, $$k_1^2 = \sqrt{\frac{A_1}{A_2}} \sqrt{(\sigma_1^2 - \omega_1^2)(\omega_{2n+1}^2 - \sigma_1^2)} = \sqrt{\frac{A_1}{A_2}} \frac{\delta_1^2}{\sigma_{2n}^2 - \sigma_1^2}$$

Reduction of one resonant circuit at $X_2$.

(d2) $\quad k_1^2 = \infty, \xi^2 = \sigma_1^2$ $$k_{2n}^2 = \sqrt{\frac{A_1}{A_2}} \frac{\sqrt{(\sigma_{2n}^2 - \omega_1^2)(\omega_{2n+1}^2 - \sigma_{2n}^2)}}{\sigma_{2n}^2 - \sigma_1^2} = \sqrt{\frac{A_1}{A_2}} \frac{\delta_{2n}^2}{\sigma_{2n}^2 - \sigma_1^2}$$

Reduction of one resonant circuit at $X_2$.

(B) $\epsilon = -1$. Consideration of these cases is easier.

We have

(53) $\quad k_1^2 = \sqrt{\dfrac{A_1}{A_2}} \dfrac{\delta_1^2}{\xi^2 + \sigma_1^2}$ (53′) $\quad k_{2n}^2 = \sqrt{\dfrac{A_1}{A_2}} \dfrac{\delta_{2n}^2}{\xi + \sigma_{2n}^2}$ consequently:

$$k_1^2 < \sqrt{\frac{A_1}{A_2}} \frac{\delta_1^2}{\sigma_1^2} k_{2n}^2 < \sqrt{\frac{A_1}{A_2}} \frac{\delta_{2n}^2}{\sigma_{2n}^2}$$

$k_1^2$ and $k_{2n}^2$ will, in the very general conditions hereinbefore indicated, be less than 1.

Likewise $$k_1^2 \xi^2 < \sqrt{\frac{A_1}{A_2}} \delta_1^2, k_{2n}^2 \xi^2 < \sqrt{\frac{A_1}{A_2}} \delta_{2n}^2$$

will be less than $X^2$.

We have therefore a reduction of one resonant circuit at $X_1$ for $k_1^2$ or at $X_2$ for $k_{2n}^2$.

In order that $k_1^2 = k_{2n}^2$, it is necessary that:

$$\frac{\delta_1^2}{\xi^2 + \sigma_1^2} = \frac{\delta_{2n}^2}{\xi^2 + \sigma_{2n}^2} = \frac{\delta_{2n}^2 - \delta_1^2}{\sigma_{2n}^2 - \sigma_1^2}$$

hence $$\xi_m^2 = \frac{\sigma_{2n}^2 \delta_1^2 - \sigma_1^2 \delta_{2n}^2}{\sigma_{2n}^2 - \sigma_1^2}, k_m^2 = \sqrt{\frac{A_1}{A_2}} \frac{\delta_{2n}^2 - \delta_1^2}{\sigma_{2n}^2 - \sigma_1^2}$$

$k_m^2$ and $\xi_n^2$ are positive if:

$$1 > \frac{\sigma_1^2}{\sigma_{2n}^2} > \frac{\sigma_1^2}{\sigma_{2n}^2}$$

Upon comparing the results of the various cases considered, we conclude that whatever the value of $$\frac{\sigma_1^2}{\sigma_{2n}^2}$$

relatively to 1 and to $$\frac{\sigma_1^2}{\sigma_{2n}^2}$$

a gain of two resonant circuits is always possible under the very general conditions which have been assumed, such gain being one circuit in the unit $X_1$ and one circuit in the unit $X_2$. The gain of two circuits in the same reactance is realisable under more restrictive conditions. It is to be observed that if the conditions are not fulfilled, the realisation for a value to be determined of $\epsilon \xi^2$, of the equality of the two smaller values of the value $k_1^2$, $k_{2n}^2$, 1, $$\frac{X^2}{\xi^2}$$

also allows a reduction in the number of elements, but a less substantial one.

It will easily be seen that it is possible to effect the transformation at the reactance $Z_2$ of the smaller degree.

What is claimed is:

1. An electrically symmetrical band pass filter characterized by the fact that it consists of a lattice cell comprising two opposite identical branches and two opposite unlike branches, and that it contains a total of four inductances and four capacitances and $$2m - 1 - \sin^2 \frac{mn}{2}$$

resonant circuits, $m$ being the total number of zeros and poles of the characteristic attenuation function inside the pass band, whose characteristic impedance $Z$ varies as a function of the angular frequency $\omega$ according to the formula:

$$Z = \frac{p}{C\sqrt{(p^2 \mp \omega_\alpha^2)(p^2 + \omega_\beta^2)}}$$

$p$ designating the quantity $j\omega$ and $C$ being a constant, and whose attenuation function is $$\tanh \frac{P}{2}$$

the real part of $P$ being equal to the characteristic attenuation and its imaginary part or characteristic phase shift—which varies as a function of $\omega$ according to the formula $$\tanh \frac{P}{2} = \frac{HU_n}{V_n} \sqrt{\frac{p^2 + \omega_\beta^2}{p^2 + \omega_\alpha^2}}$$

where H is a constant and $$U_n = (p^2 + \omega_2^2)(p^2 + \omega_4^2) \ldots (p^2 + \omega_{2n}^2)$$
$$V_n = (p^2 + \omega_3^2)(p^2 + \omega_5^2) \ldots (p^2 + \omega_{2n+1}^2)$$

$\omega_2, \omega_3, \ldots \omega_{2n+1}$ being the angular frequencies between $\omega_\alpha$ and $\omega_\beta$ and arranged in the order of increasing values, for which the characteristic phase shift takes values which are multiples of $\pi$, said filter being characterized by the fact that the equal and opposite branches are made up of reactances equal to $$\frac{pV_n}{HC(p^2 + \omega_\beta^2)U_n}$$

and that the other opposite branches are reactances defined by:

$$x_1 = \frac{p(H^2 U_n + k_1^2 V_n)}{CH((p^2 + \omega_\alpha^2)V_n - k_1^2(p^2 + \omega_\beta^2)U_n)}$$

$$x_2 = \frac{p(H^2 U_n - k_1^2 V_n)}{CH((p^2 + \omega_\alpha^2)V_n + k_1^2(p^2 + \omega_\beta^2)U_n)}$$

$k_1^2$ being a constant equal to $$\sqrt{H \frac{\sigma_1^2 - \omega_\alpha^2}{\omega_\beta^2 - \sigma_1^2}}$$

and $\sigma_1$ being the angular frequency between $\omega_\alpha$ and $\omega_\beta$ for which the following expression becomes zero:

$$H^2(p^2 + \omega_\beta^2)U_n^2 + (p^2 + \omega_\alpha^2)V_n^2$$

the reactance $x_2$ including, then, under the following condition, $$k_1^2 < \frac{\omega_\alpha^2 \omega_3^2 \ldots \omega_{2n+1}^2}{\omega_2^2 \omega_4^2 \ldots \omega_\beta^2}$$

necessary for the filter to be physically realisable, $n-1$ resonant circuits only in its "shunt" realisation, in addition to an inductance and a capacitance, while the other branches comprise $n$ resonant circuits, in addition to the same elements.

2. An electrically symmetrical band pass filter characterized by the fact that it consists of a lattice cell comprising two opposite identical branches and two opposite unlike branches, and that it contains a total of four inductances and four capacitances and $$2m - 1 - \sin^2 \frac{mn}{2}$$

resonant circuits, $m$ being the total number of zeros and poles of the characteristic attenuation function inside the pass band, having a characteristic impedance $Z$ which varies as a function of the angular frequency $\omega$ according to the formula:

$$Z = \frac{p}{C\sqrt{(p^2 + \omega_\alpha^2)(p^2 + \omega_\beta^2)}}$$

$p$ designating the quantity $j\omega$, and $C$ being constant, and an attenuation function $$\tanh \frac{P}{2}$$

the real part of $P$ being equal to the characteristic attenuation and its imaginary part or characteristic phase shift, which varies as a function of $\omega$ according to the formula $$\tanh \frac{P}{2} = \frac{HU_n}{V_n} \sqrt{\frac{p^2 + \omega_\beta^2}{p^2 + \omega_\alpha^2}}$$

where H is a constant $$U_n = (p^2 + \omega_2^2)(p^2 + \omega_4^2) \ldots (p^2 + \omega_{2n}^2)$$
$$V_n = (p^2 + \omega_3^2)(p^2 + \omega_5^2) \ldots (p^2 + \omega_{2n+1}^2)$$

$\omega_2, \omega_3, \ldots \omega_{2n+1}$ being the angular frequencies between $\omega_\alpha$ and $\omega_\beta$, and arranged in the order of increasing values, for which the characteristic phase shift assumes values which are multiples of $\pi$, said filter being characterized by the fact that the opposite branches, equal, are made up of reactances equal to $$\frac{HpU_n}{C(p^2+\omega_\alpha^2)V_n}$$

and that the other opposite branches are reactances defined by:

$$S_1 = \frac{p(V_n+k_{2n+1}^2 H^2 U_n)}{CH((p^2+\omega_\beta^2)U_n - k_{2n+1}^2(p^2+\omega_\alpha^2)V_n)}$$

$$S_2 = \frac{p(V_n - k_{2n+1}^2 H^2 U_n)}{CH((p^2+\omega_\beta^2)U_n + k_{2n+1}^2(p^2+\omega_\alpha^2)V_n)}$$

$k^2_{2n+1}$ being a constant equal to $$\sqrt{\frac{1}{H}\frac{\omega_\beta^2 - \sigma_{2n+1}^2}{\sigma_{2n+1}^2 - \omega_\alpha^2}}$$

$\sigma_{2n+1}$ being the angular frequency between $\omega_\alpha$ and $\omega_\beta$ for which the following expression becomes zero:

$$H^2(p^2+\omega_\beta^2)U_n^2 + (p^2+\omega_\alpha^2)V_n^2$$

the reactance $S_2$ then comprising, under the following condition:

$$k^2_{2n+1} < 1$$

necessary for the filter to be physically realisable, $(n-1)$ resonant circuits only, in its "shunt" realisation, in addition to an inductance and a capacitance, while the other branches comprise $n$ resonant circuits in addition to the same elements.

3. An electrically symmetrical band pass filter characterized by the fact that it consists of a lattice cell comprising two opposite identical branches and two opposite unlike branches, and that it contains a total of four inductances and four capacitances and $$2m-1-\sin^2\frac{m\pi}{2}$$

resonant circuits, $m$ being the total number of zeros and poles of the characteristic attenuation function inside the pass band, having as a characteristic impedance function $$Z = \frac{p}{C\sqrt{\left(p^2+\omega_\alpha^2\right)\left(p^2+\omega_\beta^2\right)}}$$

and as a characteristic attenuation function:

$$\tanh\frac{P}{2} = \frac{HU_n}{V_{n-1}}\frac{1}{\sqrt{(p^2+\omega_\alpha^2)(p^2+\omega_\beta^2)}}$$

characterized by the fact that the equal opposite branches are made up of reactances equal to $$\frac{1}{CH}\frac{pV_{n-1}}{U_n}$$

and that the other opposite branches are reactances $Z_1$, $Z_2$, defined by:

$$x_1 = \frac{p}{CH}\frac{H^2U_n + k_m^2(p^2+\epsilon\xi_m^2)V_{n-1}}{(p^2+\omega_\alpha^2)(p^2+\omega_\beta^2)V_{n-1} - k_m^2(p^2+\epsilon\xi_m^2)U_n}$$

$$x_2 = \frac{p}{CH}\frac{H^2U_n - k_m^2(p^2+\epsilon\xi_m^2)V_{n-1}}{(p^2+\omega_\alpha^2)(p^2+\omega_\beta^2)V_{n-1} + k_m^2(p^2+\epsilon\xi_m^2)U_n}$$

said reactances each comprising $(n-1)$ resonant circuits, in their "shunt" realisation, in addition to an inductance, as well as those of the equal branches, the parameters $k_m^2$, $\epsilon_m^2$ and the choice of the sign of $\epsilon$ being determined as follows: Let $-\sigma_1^2$ and $-\sigma_{2n}^2$ be the zeros of:

$$H^2U_n^2 + (p^2+\omega_\alpha^2)(p^2+\omega_\beta^2)V_{n-1}^2$$

located respectively between $-\omega_\alpha^2$ and $-\omega_2^2$, $-\omega_{2n}^2$, and $-\omega_\beta^2$, and $\delta_1^2$, $\delta_{2n}^2$, defined by $$\delta_1^2 = \sqrt{(\sigma_1^2-\omega_\alpha^2)(\omega_\beta^2-\sigma_1^2)}$$

$$\delta_{2n}^2 = \sqrt{(\omega_\beta^2-\sigma_{2n}^2)(\sigma_{2n}^2-\omega_\alpha^2)}$$

(a) If $\frac{\delta_1^2}{\delta_{2n}^2} > 1$, one takes:

$$k_m^2 = H\frac{\delta_1^2 - \delta_{2n}^2}{\sigma_{2n}^2 - \sigma_1^2}$$

$$\xi_m^2 = \frac{\delta_1^2\sigma_{2n}^2 - \sigma_1^2\delta_{2n}^2}{\delta_1^2 - \delta_{2n}^2}$$

$$\epsilon = +1$$

(b) If $\frac{\sigma_1^2}{\sigma_{2n}^2} < \frac{\delta_1^2}{\delta_{2n}^2} < 1$, one takes:

$$k_m^2 = H\frac{\delta_{2n}^2 - \delta_1^2}{\sigma_{2n}^2 - \sigma_1^2}$$

$$\xi_m^2 = \frac{\delta_1^2\sigma_{2n}^2 - \sigma_1^2\delta_{2n}^2}{\delta_{2n}^2 - \delta_1^2}$$

$$\epsilon = -1$$

(c) If $\frac{\delta_1^2}{\delta_{2n}^2} < \frac{\sigma_1^2}{\sigma_{2n}^2}$ one takes:

$$k_m^2 = H\frac{\delta_{2n}^2 - \delta_1^2}{\sigma_{2n}^2 - \sigma_1^2}$$

$$\xi_m^2 = \frac{\sigma_1^2\delta_{2n}^2 - \sigma_{2n}^2\delta_1^2}{\delta_{2n}^2 - \delta_1^2}$$

$$\epsilon = +1$$

the following conditions must be fulfilled for the filter branches to be physically realisable:

$$k_m^2 < 1 \text{ and } k_m^2\xi_m^2 < \frac{\omega_\alpha^2\omega_3^2\ldots\omega_{2n-1}^2\omega_\beta^2}{\omega_2^2\omega_4^2\ldots\omega_{2n}^2}$$

4. An electrically symmetrical band pass filter characterized by the fact that it consists of a lattice cell comprising two opposite identical branches and two opposite unlike branches, and that it contains a total of four inductances and four capacitances and $$2m-1-\sin^2\frac{m\pi}{2}$$

resonant circuits, $m$ being the total number of zeros and poles of the characteristic attenuation function inside the pass band, having as a characteristic impedance function:

$$Z = \frac{p}{C\sqrt{(p^2\mp\omega_\alpha^2)(p^2+\omega_\beta^2)}}$$

and as a characteristic attenuation function:

$$\tanh\frac{P}{2} = \frac{HU_n}{V_{n-1}}\frac{1}{\sqrt{(p^2+\omega_\alpha^2)(p^2+\omega_\beta^2)}}$$

said filter being characterized by the fact that the equal opposite branches are made up of reactances equal to $$\frac{1}{CH}\frac{pV_{n-1}}{U_n}$$

and that the other opposite branches are reactances $x_1$, $x_2$ defined by:

$$x_1 = \frac{p}{CH}\frac{H^2U_n + k_m^2(p^2+\epsilon\xi_m^2)V_{n-1}}{(p^2+\omega_\alpha^2)(p^2+\omega_\beta^2)V_{n-1} - k_m^2(p^2+\epsilon\xi_m^2)U_n}$$

$$x_2 = \frac{p}{CH}\frac{H^2U_n - k_m^2(p^2+\epsilon\xi_m^2)V_{n-1}}{(p^2+\omega_\alpha^2)(p^2+\omega_\beta^2)V_{n-1} + k_m^2(p^2+\epsilon\xi_m^2)U_n}$$

with: $\epsilon = +1$ $$k_m^2 = H \frac{\delta_1^2 + \delta_{2n}^2}{\sigma_{2n}^2 - \sigma_1^2}$$

$$\xi_m^2 = \frac{\sigma_1^2 \delta_{2n}^2 + \sigma_{2n}^2 \delta_1^2}{\delta_1^2 + \delta_{2n}^2}$$

$-\sigma_1^2$, $-\sigma_{2n}^2$ being the zeros of $$H^2 U_n^2 + (p^2 + \omega_\alpha^2)(p^2 + \omega_\beta^2) V_n^2 - 1$$

located respectively between $-\omega_\alpha^2$ and $-\omega_2^2$, $-\omega_{2n}^2$ and $\omega_\beta^2$ and $\delta_1^2$, $\delta_{2n}^2$ being defined by:

$$\delta_1^2 = \sqrt{(\sigma_1^2 - \omega_\alpha^2)(\omega_\beta^2 - \sigma_1^2)}$$

$$\delta_{2n}^2 = \sqrt{(\omega_\beta^2 - \sigma_{2n}^2)(\sigma_{2n}^2 - \omega_\alpha^2)}$$

the reactance $x_2$ comprising, in its "shunt" realisation, $n-2$ resonant circuits, in addition to an inductance, while the $x_1$ reactance comprises $n$ such circuits, the following conditions having to be met for the filter branches to be realisable:

$$k_m^2 < 1 \quad k_m^2 \xi_m^2 < \frac{\omega_\alpha^2 \omega_3^2 \ldots \omega_{2n-1}^2 \omega_\beta^2}{\omega_2^2 \omega_4^2 \ldots \omega_{2n}^2}$$

5. An electrically symmetrical band pass filter characterized by the fact that it consists of a lattice cell comprising two opposite identical branches and two opposite unlike branches, and that it contains a total of four inductances and four capacitances and $$2m - 1 - \sin^2 \frac{mn}{2}$$

resonant circuits, $m$ being the total number of zeros and poles of the characteristic attenuation function inside the pass band, having as a characteristic impedance function $$Z = \frac{C\sqrt{(p^2 + \omega_\alpha^2)(p^2 + \omega_\beta^2)}}{p}$$

C being a constant, and as a characteristic attenuation function $$\tanh \frac{P}{2} = H \frac{U_n}{V_n} \sqrt{\frac{p^2 + \omega_\beta^2}{p^2 + \omega_\alpha^2}}$$

$U_n$ and $V_n$ being defined by the equations $$U_n = (p^2 + \omega_2^2)(p^2 + \omega_4^2) \ldots (p^2 + \omega_{2n}^2)$$

$$V_n = (p^2 + \omega_3^2)(p^2 + \omega_5^2) \ldots (p^2 + \omega_{2n+1}^2)$$

said filter being characterized by the fact that the equal opposite branches consist of reactances equal to:

$$\frac{HC(p^2 + \omega_\beta^2) U_n}{pV_n}$$

where H is a constant and in that the other opposite branches are reactances defined by:

$$x_1 = \frac{CH((p^2 + \omega_\alpha^2) V_n - k_1^2 (p^2 + \omega_\beta^2) U_n)}{p(H^2 U_n + k_1^2 V_n)}$$

$$x_2 = \frac{CH((p^2 + \omega_\alpha^2) V_n + k_1^2 (p^2 + \omega_\beta^2) U_n)}{p(H^2 U_n - k_1^2 V_n)}$$

$k_1^2$ being defined as in claim 2 and having to meet the same condition as in said claim, the reactance $x_2$ then comprising in its series realisation, an inductance in series with the parallel grouping of a capacitance and resonant circuits, $(n-1)$ resonant circuits only whereas in the circuit diagram of the same type, the other reactances comprise $n$ such circuits.

6. An electrically symmetrical band pass filter characterized by the fact that it consists of a lattice cell comprising two opposite identical branches and two opposite unlike branches, and that it contains a total of four inductances and four capacitances and $$2m - 1 - \sin^2 \frac{mn}{2}$$

resonant circuits, $m$ being the total number of zeros and poles of the characteristic attenuation function inside the pass band, having as a characteristic impedance function:

$$Z = \frac{C\sqrt{(p^2 + \omega_\alpha^2)(p^2 + \omega_\beta^2)}}{p}$$

C being a constant, and as a characteristic attenuation function:

$$\tanh \frac{P}{2} = H \frac{U_n}{V_n} \sqrt{\frac{p^2 + \omega_\beta^2}{p^2 + \omega_\alpha^2}}$$

where H is a constant, $U_n$ and $V_n$ being defined as in claim 2, said filter being characterized by the fact that the equal and opposite branches consist of reactances equal to $$\frac{C(p^2 + \omega_\alpha^2) V_n}{H p U_n}$$

and in that the other opposite branches are reactances defined by:

$$S_1 = \frac{CH(p^2 + \omega_\beta^2) U_n - k_{2n+1}^2 (p^2 + \omega_\alpha^2) V_n}{p(V_n + k_{2n+1}^2 H^2 U_n)}$$

$$S_2 = \frac{CH(p^2 + \omega_\beta^2) U_n + k_{2n+1}^2 (p^2 + \omega_\alpha^2) V_n}{p(V_n - k_{2n+1}^2 H^2 U_n)}$$

$k_{2n+1}^2$ being a constant equal to $$\sqrt{\frac{1}{H} \frac{\omega_\beta^2 - \sigma_{2n+1}^2}{\sigma_{2n+1}^2 - \omega_\alpha^2}}$$

where H is a constant and $\sigma_{2n+1}$ is the angular frequency between $\omega_\alpha$ and $\omega_\beta$ for which the value zero is attained by the expression $$H^2(p^2 + \omega_\beta^2) U_n^2 + (p^2 + \omega_\alpha^2) V_n^2$$

where $$U_n = (p^2 + \omega_2^2)(p^2 + \omega_4^2) \ldots (p^2 + \omega_{2n}^2)$$

$$V_n = (p^2 + \omega_3^2)(p^2 + \omega_5^2) \ldots (p^2 + \omega_{2n+1}^2)$$

and having to meet the same condition as in said claim, the reactance $S_2$ then comprising, in its realisation by series connection of an inductance with the parallel grouping of a capacitance and resonant circuits, $(n-1)$ resonant circuits only whereas in the circuit diagram of the same type, the other reactances comprise $n$ such circuits.

7. An electrically symmetrical band pass filter characterized by the fact that it consists of a lattice cell comprising two opposite identical branches and two opposite unlike branches, and that it contains a total of four inductances and four capacitances and $$2m - 1 - \sin^2 \frac{mn}{2}$$

resonant circuits, $m$ being the total number of zeros and poles of the characteristic attenuation function inside the pass band, having as a characteristic impedance function:

$$Z = \frac{C\sqrt{(p^2 + \omega_\alpha^2)(p^2 + \omega_\beta^2)}}{p}$$

and as a characteristic attenuation function:

$$\tanh \frac{P}{2} = \frac{H U_n}{V_{n-1}} \frac{1}{\sqrt{(p^2 + \omega_\alpha^2)(p^2 + \omega_\beta^2)}}$$

$U_n$ and $V_n$ being defined by the equations $$U_n = (p^2+\omega_2^2)(p^2+\omega_4^2) \ldots (p^2+\omega_{2n}^2)$$
$$V_n = (p^2+\omega_3^2)(p+\omega_5^2) \ldots (p^2+\omega_{2n+1}^2)$$

said filter being characterized by the fact that the equal and opposite branches consist of reactances equal to $$\frac{CHU_n}{pV_{n-1}}$$

and in that the other opposite branches are reactances defined by:

$$x_1 = \frac{CH}{p} \frac{(p^2+\omega_\alpha^2)(p^2+\omega_\beta^2)V_{n-1} - k_m^2(p^2+\epsilon\xi_m^2)U_n}{H^2U_n + k_m^2(p^2+\epsilon\xi_m^2)V_{n-1}}$$

$$x_2 = \frac{CH}{p} \frac{(p^2+\omega_\alpha^2)(p^2+\omega_\beta^2)V_{n-1} + k_m^2(p^2+\epsilon\xi_m^2)U_n}{H^2U_n - k_m^2(p^2+\epsilon\xi_m^2)V_{n-1}}$$

$$\epsilon = \frac{+}{-}1$$

$k_m^2$, $\epsilon_m^2$ and the sign of $\epsilon$ being determined as indicated in said claim, $k_m^2$ and $\epsilon_m^2$ having to meet the same conditions, $x_1$ and $x_2$ then comprising, in their realisation by connection in series of an inductance with the parallel grouping of a capacitance and resonant circuits, $(n-1)$ resonant circuits.

8. An electrically symmetrical band pass filter characterized by the fact that it consists of a lattice cell comprising two opposite identical branches and two opposite unlike branches, and that it contains a total of four inductances and four capacitances and $$2m - 1 - \sin^2 \frac{mn}{2}$$

resonant circuits, $m$ being the total number of zeros and poles of the characteristic attenuation function inside the pass band, having as a characteristic impedance function $$Z = \frac{C\sqrt{(p^2+\omega_\alpha^2)(p^2+\omega_\beta^2)}}{p}$$

and as a characteristic attenuation function:

$$\tanh \frac{P}{2} = \frac{HU_n}{V_{n-1}} \frac{1}{\sqrt{(p^2+\omega_\alpha^2)(p^2+\omega_\beta^2)}}$$

$U_n$ and $V_n$ being defined by the equations $$U_n = (p^2+\omega_2^2)(p^2+\omega_4^2) \ldots (p^2+\omega_{2n}^2)$$
$$V_n = (p^2+\omega_3^2)(p^2+\omega_5^2) \ldots (p^2+\omega_{2n+1}^2)$$

said filter being characterized by the fact that the equal and opposite branches consist of reactances equal to $$\frac{CHU_n}{pV_{n-1}}$$

the other branches consisting of reactances defined by:

$$x_1 = \frac{CH}{p} \frac{(p^2+\omega_\alpha^2)(p^2+\omega_\beta^2)V_{n-1} - k_m^2(p^2+\xi_m^2)U_n}{H^2U_n + k_m^2(p^2+\xi_m^2)V_{n-1}}$$

$$x_2 = \frac{CH}{p} \frac{(p^2+\omega_\alpha^2)(p^2+\omega_\beta^2)V_{n-1} + k_m^2(p^2+\xi_m^2)U_n}{H^2U_n - k_m^2(p^2+\xi_m^2)V_{n-1}}$$

$k_m^2$ and $\xi_m^2$ being defined by the equations $$k_m^2 = H \frac{\delta_1^2 + \delta_{2n}^2}{\sigma_{2n}^2 - \sigma_1^2}$$

$$\xi_m^2 = \frac{\sigma_1^2 \delta_{2n}^2 + \sigma_{2n}^2 \delta_1^2}{\delta_1^2 + \delta_{2n}^2}$$

$-\sigma_1^2$ and $-\sigma_{2n}^2$ being the zeros of $$H^2U_n^2 + (p^2+\omega_\alpha^2)(p^2+\omega_\beta^2)V_{n-1}^2$$

located respectively between $-\omega_\alpha^2$ and $-\omega_2^2$, $-\omega_{2n}^2$ and $-\omega_\beta^2$ and $\delta_1^2$ and $\delta_{2n}^2$ being defined by $$\delta_1^2 = \sqrt{(\sigma_1^2-\omega_\alpha^2)(\omega_\beta^2-\sigma_1^2)}$$
$$\delta_{2n}^2 = \sqrt{(\omega_\beta^2-\sigma_{2n}^2)(\sigma_{2n}^2-\omega_\alpha^2)}$$

and having to meet the same conditions as in said claim, the reactance $x_2$ then comprising in its realisation by connection in series of an inductace with the parallel grouping of a capacitance and resonant circuits $n-2$ resonant circuits only while $x_1$ comprises $n$ such circuits, in a realisation by a diagram of the same type.

ROBERT PIERRE LEROY.

REFERENCES CITED

The following references are of record in the file of this patent:

UNITED STATES PATENTS

| Number | Name | Date |
| --- | --- | --- |
| 1,996,504 | Darlington | Apr. 2, 1935 |
| 2,037,171 | Lane | Apr. 14, 1936 |
| 2,115,138 | Darlington | Apr. 26, 1938 |
| 2,222,417 | Mason | Nov. 19, 1940 |